(12) United States Patent
Azari et al.

(10) Patent No.: US 9,201,954 B1
(45) Date of Patent: Dec. 1, 2015

(54) MACHINE-ASSISTED PUBLISHER CLASSIFICATION

(71) Applicant: Amazon Technologies, Inc., Reno, NV (US)

(72) Inventors: David Rezazadeh Azari, Seattle, WA (US); Divya Mahalingam, Seattle, WA (US); Tanvi Milind Bhadbhade, Seattle, WA (US); Nadia Payet, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 172 days.

(21) Appl. No.: 13/782,535

(22) Filed: Mar. 1, 2013

(51) Int. Cl.
  *G06F 17/30* (2006.01)
  *G06F 15/18* (2006.01)

(52) U.S. Cl.
  CPC .......... *G06F 17/30705* (2013.01); *G06F 15/18* (2013.01)

(58) Field of Classification Search
  USPC ................................. 707/737–738, 740, 748
  See application file for complete search history.

(56) References Cited

U.S. PATENT DOCUMENTS

| | | | |
|---|---|---|---|
| 7,373,594 B1 * | 5/2008 | Lopez et al. | 715/229 |
| 7,606,810 B1 * | 10/2009 | Jeavons | 1/1 |
| 7,991,806 B2 * | 8/2011 | Broder et al. | 707/809 |
| 8,195,666 B2 * | 6/2012 | Jeavons | 707/738 |
| 8,478,758 B2 * | 7/2013 | Jeavons | 707/738 |
| 2006/0031114 A1 * | 2/2006 | Zommers | 705/10 |
| 2009/0024718 A1 * | 1/2009 | Anagnostopoulos et al. | 709/218 |
| 2010/0070339 A1 * | 3/2010 | Bae et al. | 705/10 |
| 2010/0100545 A1 * | 4/2010 | Jeavons | 707/738 |
| 2011/0060649 A1 * | 3/2011 | Dunk et al. | 705/14.53 |
| 2011/0099077 A1 * | 4/2011 | Darin et al. | 705/14.72 |
| 2011/0213655 A1 * | 9/2011 | Henkin et al. | 705/14.49 |
| 2011/0218983 A1 * | 9/2011 | Chaney et al. | 707/705 |
| 2012/0131438 A1 * | 5/2012 | Li et al. | 715/234 |
| 2012/0240021 A1 * | 9/2012 | Jeavons | 715/205 |
| 2013/0063561 A1 * | 3/2013 | Stephan | 348/46 |
| 2013/0304742 A1 * | 11/2013 | Roman et al. | 707/740 |

* cited by examiner

*Primary Examiner* — Hanh Thai
(74) *Attorney, Agent, or Firm* — Novak Druce Connolly Bove + Quigg LLP

(57) ABSTRACT

One or more computing systems can implement a classifier to classify content publishers as being likely to provide appropriate content or as being likely to provide inappropriate content. The classifier can gather information from previously classified publishers. The information from the previously classified publishers can used to train the classifier. Based on the training, the classifier can learn about traits, characteristics, and/or behavioral patterns, etc., associated with publishers that have been previously classified as being good as well as publishers previously classified as being bad. The classifier can then process information about an unclassified publisher to determine a classification for the unclassified publisher, as being good (and likely to provide appropriate content) or bad (and likely to provide inappropriate content).

25 Claims, 10 Drawing Sheets

MACHINE-ASSISTED PUBLISHER CLASSIFICATION

BACKGROUND

Books, journals, music, media, and other content play significant roles in everyone's daily lives. Content distributors receive large amounts of content from content publishers to be distributed or dissipated to consumers daily. Much of the content received from the publishers needs to be reviewed to determine whether or not the content contains inappropriate material. For example, the content can be reviewed to ensure that the content does not contain material that can violate copyright laws. In another example, the content can be reviewed to make sure that the content does not contain any offensive material. Conventional approaches typically involve manual labor by one or more human operators (e.g., hired by the content distributors) to review the content. In some cases, the amount of content to be reviewed can be large. In some cases, the content must be reviewed in a timely fashion. However, manual review of the content by human operators can be slow, inaccurate, costly, and inefficient.

BRIEF DESCRIPTION OF THE DRAWINGS

Various embodiments in accordance with the present disclosure will be described with reference to the drawings, in which.

DETAILED DESCRIPTION

Figure 1:
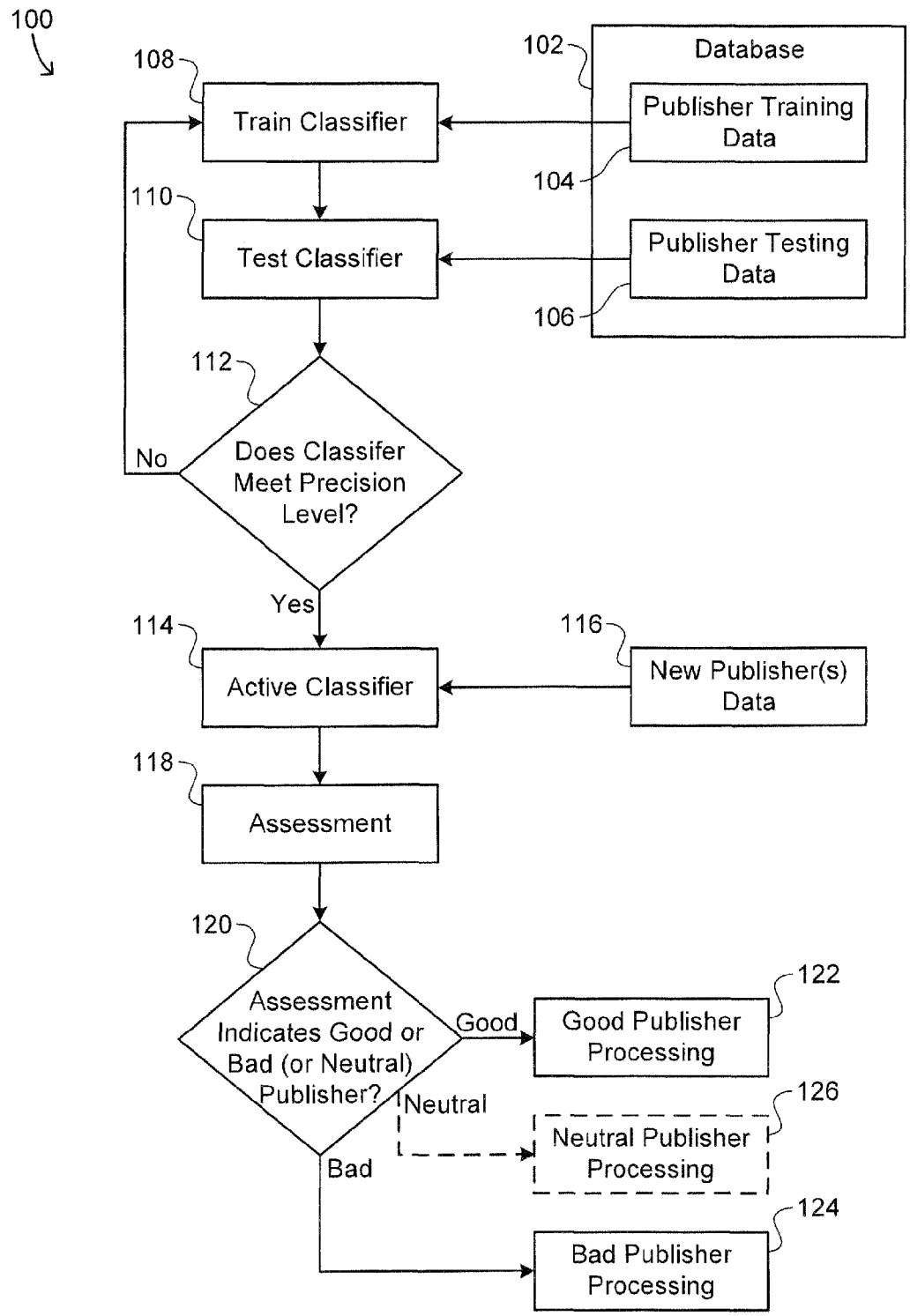
FIG. 1 illustrates an example flowchart for machine-assisted publisher classification.

Systems and methods in accordance with various embodiments of the present disclosure overcome one or more of the above-referenced and other deficiencies in conventional approaches to reviewing content and publishers. In particular, various embodiments of the present disclosure can provide an approach to training and testing a classifier model which can attempt to determine whether a publisher(s) will likely submit appropriate content or inappropriate content.

In general, machine-assisted publisher classification can utilize one or more computing devices/systems/machines to classify and/or determine a label for a content publisher (i.e., publisher). A publisher can publish content such as books (including e-books), articles, journals, software, music, television, movies, videos, media, etc. The publisher can provide the content to a content library, such as that associated with a marketplace (e.g., electronic marketplace), to be distributed to consumers.

According to conventional approaches, one or more human operators typically review content provided by publishers manually to ensure that the material in the content is appropriate. For example, inappropriate material in the content can include material triggering copyright violations, offensive material, solicitations, and/or other disallowed/unwanted material. However, the manual review process can be slow, costly, and/or inefficient.

Machine-assisted publisher classification can attempt to classify and/or determine a label for each publisher. In some embodiments, content can be reviewed on a title-level and/or a publisher-level. Title-level review refers to when each content piece is reviewed individually, such as reviewing each book provided by one or more publishers to determine whether each book is appropriate or not. Publisher-level review refers to reviewing the publishers who provide the content, such as taking into consideration the names of the publishers, the amount of time the publishers have been in business, the location of the publisher, the reputation of the publisher, etc., to determine whether it is likely that the publisher will provide appropriate content or inappropriate content.

Various publishers can possess common traits and characteristics, such as similar patterns in publisher behavior. In some embodiments, a group of publishers sharing common trait(s) and/or similar behavioral pattern(s) can be more likely to provide/submit inappropriate content, whereas another group of publishers having a different set of similarities/commonalities can be more likely to provide/submit appropriate content.

At least some embodiments enable one or more computing devices/systems/machines to implement a classifier (e.g., a classifier algorithm generating a classifier model) for classifying publishers. The classifier can receive information associated with a plurality of already classified publishers, such as publishers already classified manually. The information associated with the plurality of already classified publishers can be utilized to train the classifier. Since the publishers are already classified, the classifier can group together the publishers classified as being "good" (e.g., likely to provide/submit appropriate content) and determine any commonly shared traits, characteristics, behaviors, patterns, and/or similarities, etc., among the good publishers. Similarly, the classifier can examine the publishers already classified as being "bad" and learn about any traits, characteristics, behaviors, patterns, and/or similarities, etc., shared among the bad publishers. As such, based on the training, the classifier can know which (if any) traits, characteristics, behaviors, patterns, and/or similarities, etc., are likely to be exhibited by good publishers and which are likely to be exhibited by bad publishers.

In some embodiments, at least a portion of the information associated with the plurality of already classified publishers can be utilized to test the trained classifier. The information associated with the plurality of already classified publishers can be processed by the trained classifier to verify whether or not the classifier can classify/label the publishers correctly. If the classifier has a sufficient level of precision/quality, the classifier can be utilized for machine-assisted publisher classification. Otherwise, the classifier can be trained and/or tested repeatedly as necessary.

The trained and tested classifier can receive information associated with an unclassified (e.g., unknown, unidentified, not previously encountered, etc.) publisher. The classifier can take into consideration the information associated with the unclassified publisher to determine whether the unclassified publisher is more closely associated with good publishers or with bad publishers. Based on the information associated with the unclassified publisher, the classifier can make a determination as to how to classify the publisher (e.g., whether the publisher is good or bad). In some embodiments, the classifier can calculate a confidence score for the publisher. If the score at least meets a specified score threshold, then the publisher can be classified as a good publisher; otherwise, the publisher can be classified as a bad publisher. Depending on how the publisher is classified, the publisher can be handled and/or further processed accordingly.

Various other functions and advantages are described and suggested below as may be provided in accordance with the various embodiments.

FIG. 1 illustrates an example flowchart 100 for machine-assisted publisher classification. The flowchart 100 illustrates how an example embodiment for machine-assisted publisher classification can work. Machine-assisted publisher classification can utilize one or more computing systems (i.e., machine(s)) to classify and/or determine labels for content publishers (i.e., publishers). Each publisher can be classified/labeled as being a publisher likely to exhibit "good" behavior (i.e., as being "good") or as a publisher likely to exhibit "bad" behavior (i.e., as being "bad"). A bad publisher may, for example, frequently submit content that is inappropriate, whereas a good publisher may generally submit content that is appropriate and/or favorable to consumers.

The example flowchart 100 can refer to a database 102. The database 102 can reside with any electronic storage unit. The database 102 can store at least two types of data, both of which are associated with publishers (e.g., content publishers). For example, the two types of data can include publisher data used for training purposes 104 and publisher data used for testing purposes 106. Moreover, the two types of data (e.g., 104 and 106) can both be associated with already classified publishers. In other words, information about already classified publishers can serve as training data 104 and testing data 106.

As shown in FIG. 1, the publisher training data 104 can be utilized to train a classifier (e.g., a classifier algorithm generating a classifier model) 108. Since the publisher training data 104 is associated with already classified publishers, the classifications/labels of those publishers can already be known. For example, a classified publisher can already have a classification/label as being a good publisher (e.g., based on a previous manual and/or machine review), and so information (e.g., behavior patterns, publisher characteristics, etc.) associated with the already classified (good) publisher can be used as training data 104 to train the classifier to learn to figure out which traits (e.g., properties, characteristics, behavioral patterns, etc.) are generally associated with a good publisher. Similarly, information associated with a publisher already classified as being bad can also be used as training data 104 to train the classifier to learn to determine which traits (e.g., properties, characteristics, behavioral patterns, etc.) are generally associated with bad publishers. Based on the training of the classifier 108, the classifier can attempt to determine (e.g., predict) whether each of one or more unclassified (e.g., unidentified, previously not encountered, etc.) publishers is likely to be good or bad.

The example flowchart also refers to the classifier being tested 110. In some embodiments, the classifier can be tested 110 using the testing data 106. As mentioned above, the testing data 106 can be associated with already classified publishers. As such, the classification/labels of the publishers can already be known (e.g., based on previous manual reviews and/or based on previous predictions, etc.). In one example, a publisher already classified as being good can have particular traits, behaviors, and/or characteristics, etc. The information (including the traits, behaviors, and/or characteristics, etc.) about the publisher can be provided to the classifier, without initially informing the classifier of the publisher's classification/label (good). Since the classifier has been trained 108, the classifier can attempt to determine whether the publisher is good or bad based on the training 108. The classifier can attempt to discern whether or not the publisher has the particular patterns, properties, etc. that are generally associated with good publishers or with bad publishers, which the classifier learned about during the training 108. The classifier can make a determination/classification for the publisher and the result can be compared to the already established classification/label (good). If the result is consistent with the already established classification, a precision/accuracy level of the classifier can be increased, which can indicate that the classifier is closer to being at a quality level ready for use. If the result is inconsistent, the precision/accuracy level can be decreased, which can indicate that the classifier is not yet at a quality level ready for use.

Likewise, information associated with an already classified bad publisher can be utilized as test data 106 for testing the classifier 110. Since the classifier has been trained 108, the classifier can attempt to determine whether the publisher is good or had based on the training 108. The classifier can attempt to discern whether or not the publisher has the particular patterns, properties, etc. that are generally associated with good publishers or with bad publishers, which the classifier learned about during the training 108. The classifier can make a determination/classification for the publisher and the result can be compared to the already established classification/label (bad). If the result is consistent with the already established classification, the precision/accuracy level of the classifier can be increased, which can indicate that the classifier is closer to being at a quality level ready for use. If the result is inconsistent, the precision/accuracy level can be decreased, which can indicate that the classifier is not yet at a quality level ready for use.

If the classifier does not meet (or exceed) the precision level 112, then the classifier will receive more training 108 and testing 110. If the classifier meets the precision level 112 and is ready for use, then the classifier will be enabled/active 114. The active classifier 114 can receive information about a new publisher(s) 116, such as the trains, behaviors, and/or characteristics associated with an unclassified publisher. The active classifier 114 can utilize the information about the new publisher 116 and produce an assessment (e.g., determination, prediction, calculation, etc.) 118 indicative of whether the new publisher is likely a good publisher or a bad publisher 120. In some embodiments, the active classifier 114 can calculate a confidence score as part of the assessment 118 for the new publisher. If the confidence score meets a score threshold, the new publisher can be considered good. Otherwise, the publisher can be classified as being bad.

If the assessment 118 by the active classifier 114 indicates that the new publisher is likely a good publisher, then the new (good) publisher can be processed as a good publisher 122. In some embodiments, the new (good) publisher can be added to a group of publishers that are allowable publishers. For example, if the assessment 118 classifies/indicates the new publisher as being good, then the new publisher can be added to a whitelist. As a result, content provided by the new (good) publisher can be allowed for publication.

If the assessment 118 by the active classifier 114 indicates that the new publisher is likely a bad publisher, then the new (bad) publisher can be processed as a bad publisher 124. In some embodiments, the new (bad) publisher can be added to a group of publishers that are disallowable publishers. For example, if the assessment 118 classifies/indicates the new publisher as being bad, then the new publisher can be added to a blacklist. As a result, content provided by the new (bad) publisher can be denied for publication.

In some embodiments, the assessment 118 by the active classifier 114 can optionally indicate that the publisher is neither good nor bad, but rather a neutral publisher 126. There can be various ways to process neutral publishers 126 that a person of ordinary skill in the art would recognize. For example, a neutral publisher 126 can be further reviewed manually to determine whether it is good or bad.

Figure 2:
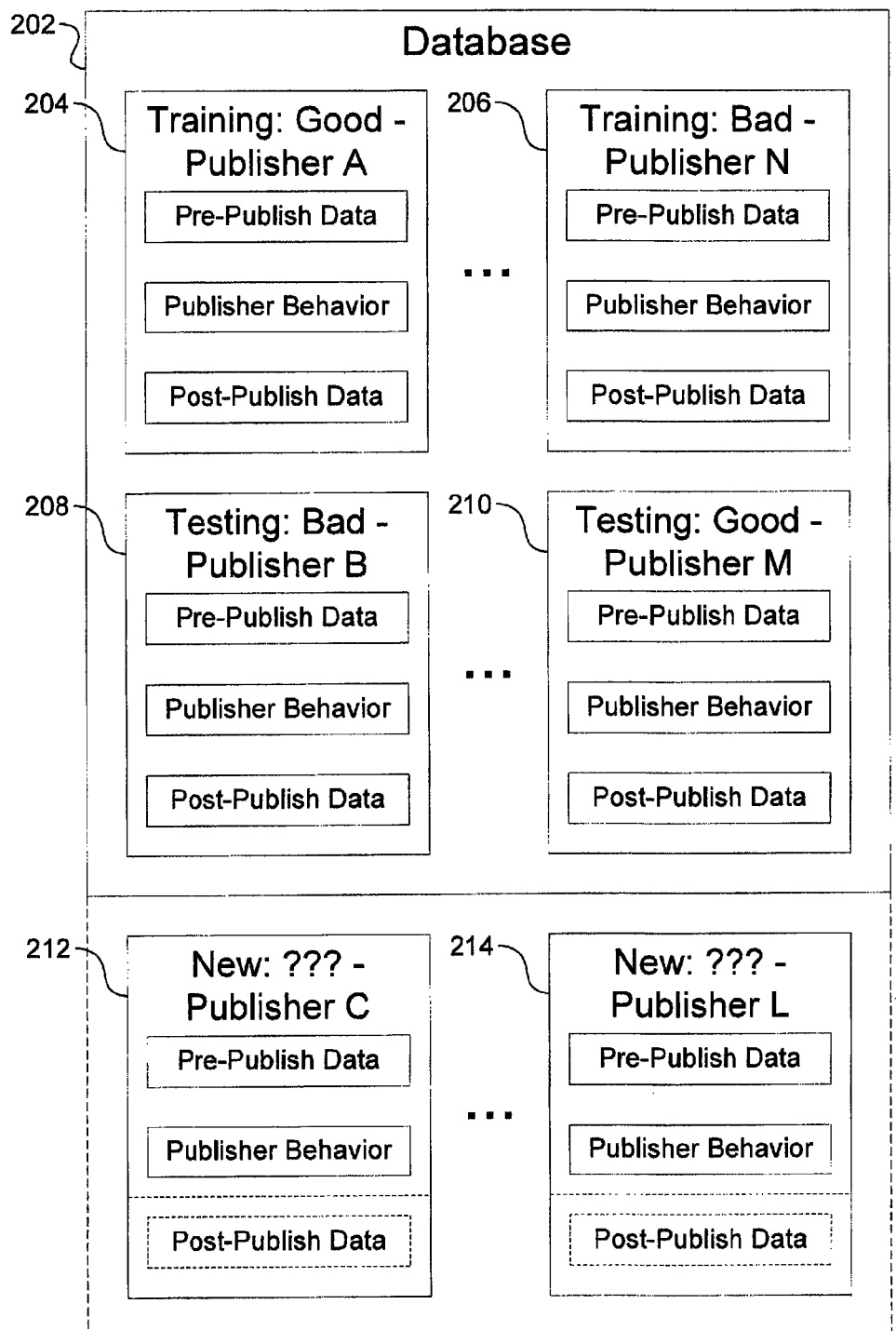
FIG. 2 illustrates example data that can be utilized with machine-assisted publisher classification.

FIG. 2 illustrates example data that can be utilized with machine-assisted publisher classification. In FIG. 2, there can be an example database 202. The example database 202 can be configured to store information associated with a plurality of publishers. In some embodiments, the plurality of publishers can already be classified. For example, the database 202 can store at least information associated with Publisher A 204, information associated with Publisher N 206, information associated with Publisher B 208, and information associated with Publisher M 210. Each of the Publishers A, N, B, and M can already have been classified (e.g., by previous manual reviewing and/or by previous machine classification, etc.) as being good or bad.

Moreover, in some embodiments, each of the Publishers A, N, B, and M can include pre-publish data, publisher behavior data, and post-publish data. Pre-publish data can refer to data related to a publisher before publication of content provided by the publisher. For example, pre-publish data of a publisher can include information about the name of the publisher, the geolocation of the publisher, a phone number of the publisher, an email address of the publisher, an online domain of the publisher, financial information associated with the publisher, and/or any organizations with which the publisher is affiliated, etc. In addition, publisher behavior data can refer to data relating to how a publisher behaves with regard to publishing/submitting content. In one example, publisher behavior data can comprise information about whether or not the publisher provided proof of copyright, about how many titles the publisher has submitted, and/or about the average velocity for the titles submitted by the publisher, etc. Further, post-publish data can refer to data related to a publisher subsequent to publication of content provided by the publisher. For example, post-publish data can include customer reviews of content published by the publisher, editorial reviews of the content published by the publisher, whether anyone has alleged copyright violation with respect to the content published by the publisher, how many high ratings of the content, how many low ratings of the content, how many returns/exchanges of the content, and/or other types of user feedback (i.e., user-related feedback), etc.

Various embodiments of the present disclosure can utilize one or more of the preceding metrics (e.g., data, information) alone or in combination to determine any similarities (e.g., patterns) between publishers associated with one classification (e.g., good) and publishers associated with another classification (e.g., bad). In some embodiments, the information associated with at least some of the plurality of publishers (e.g., Publisher A 204 and Publisher N 206) can be utilized to train the classifier (see, e.g., 108 in FIG. 1). For example, the classifier can learn about similarities between good publishers (e.g., Publisher A 204) as well as similarities between bad publishers (e.g., Publisher N 206), such that an unclassified publisher can be classified by the classifier as being good or bad based on the examining whether the unclassified publisher has the similarities associated with good publishers or the similarities associated with bad publishers.

In some embodiments, the information associated with at least some of the plurality of publishers (e.g., Publisher B 208 and Publisher M 210) can be utilized to test the classifier (see, e.g., 110 in FIG. 1), for example, to ensure that the classifier is functioning properly. In one example, the classifier can examine the information associated with Publisher B 208 but the classification/label (bad) of Publisher B is kept from the classifier. If the classifier determines (e.g., based on the training received) that Publisher B 208 is bad, then the classifier's precision/quality level can be increased. Otherwise, the precision/quality level can be decreased. In another example, the classifier can examine the information associated with Publisher M 210 but the classification/label (good) of Publisher M is kept from the classifier. If the classifier determines that Publisher M 210 is good, then the classifier's precision/quality level can be increased. Otherwise, the precision/quality level can be decreased. In some embodiments, the classifier can be trained and/or tested again until the desire level of precision/quality is met.

Also shown in FIG. 2 is information about one or more new (e.g., unclassified) publishers (e.g., Publisher C 212 and Publisher L 214). In some embodiments, data associated with the new publishers can be stored at the database 202. In some embodiments, the data associated with the new publishers can be stored external to the database 202. Further, prior to having its content published, a new publisher can comprise pre-publish data and publisher behavior data. If and when the content of the new publisher gets published, then the new publisher may receive post-publish data.

In some embodiments, the trained and tested classifier can attempt to classify the one or more new publishers. The classifier can examine the information (e.g., pre-publish data and publisher behavior data) associated with a new publisher and produce an assessment for the new publisher indicating whether the new publisher is likely good or bad (i.e., classifying the new publisher as being good or bad). In some embodiments, the newly classified published can be utilized for training and/or testing the classifier. Moreover, in some embodiments, subsequent to the classification/assessment, additional data such as post-publish data (e.g., reviews, copyright violation notifications, etc.) can alter the classification/assessment of the publisher.

Figure 3A:
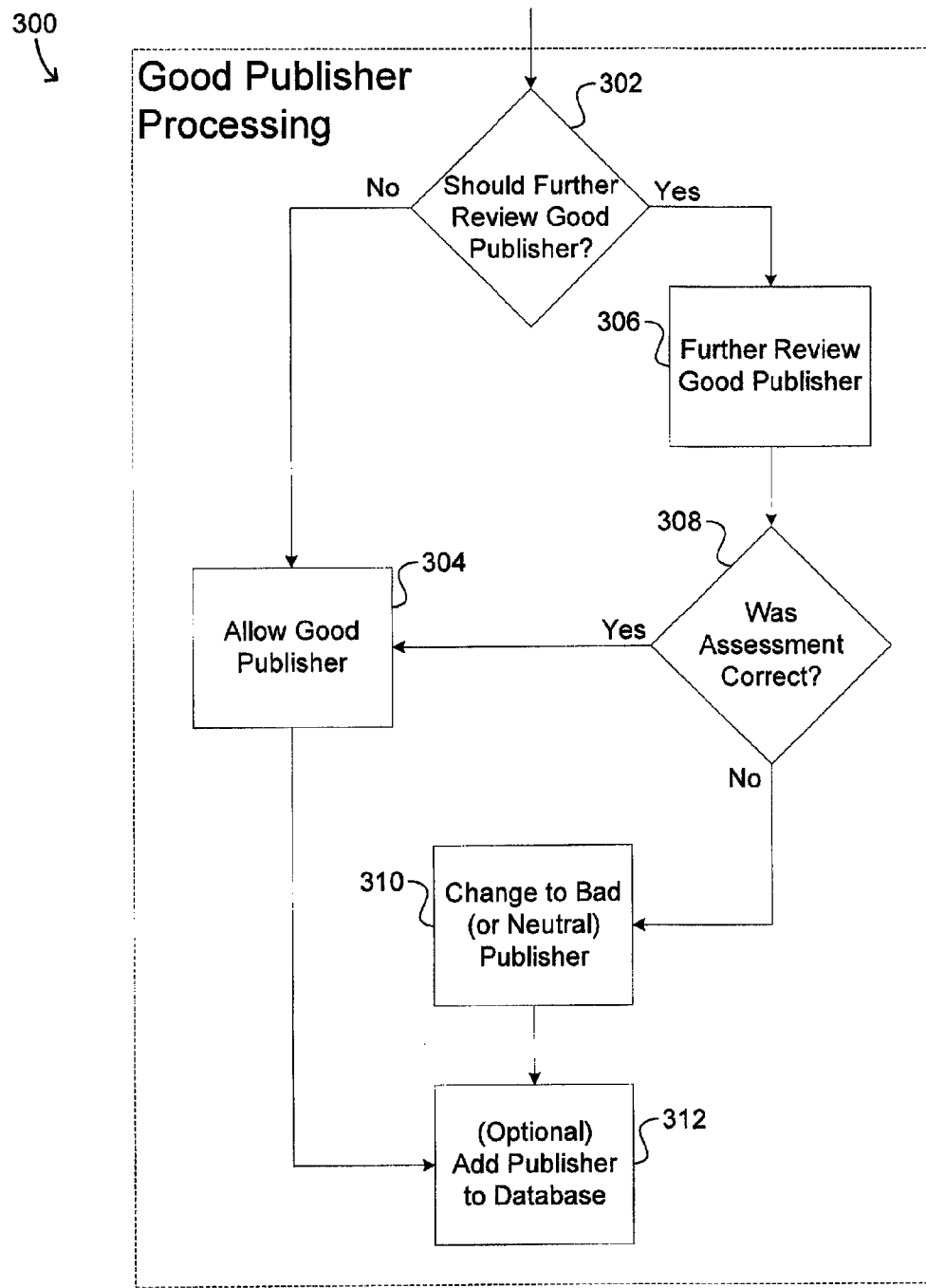
FIG. 3A illustrates an example flowchart for processing a classified publisher utilizing machine-assisted publisher classification.

FIG. 3A illustrates an example flowchart for processing a classified publisher utilizing machine-assisted publisher classification. In some embodiments, when a publisher has been classified as likely being good, the good publisher can be further processed, as illustrated in the example flowchart 300 of FIG. 3A. In some embodiments, the good publisher can be examined to determine whether or not to review the publisher further 302. For example, if the confidence score for the good publisher exceeds the score threshold by a sufficient amount, then there need not be further review, the publisher remains good, and content submitted by the good publisher will be allowed to be published 304. Otherwise, the good publisher can be reviewed further 306. In some embodiments, one or more computing systems and/or human operators can perform the further review 306. In some embodiments, the further review 306 can be with respect to only particular portions of information associated with the publisher (and/or the content provided by the publisher).

In some embodiments, the further review 306 can determine whether or not the previous assessment/classification was correct 308. If the assessment/classification (good) was correct 308, then the good publisher can be allowable (e.g., the publisher is placed on a whitelist) and content submitted by the publisher can likely be allowed 304. However, if the assessment/classification (good) was incorrect 308, then the assessment/classification for the publisher can be changed 310 to bad. For example, if the further review 306 indicates that the publisher has a likelihood of being bad that at least meets a bad publisher threshold, then the assessment/classification for the publisher can be changed 310 to bad. Moreover, in some embodiments, if the assessment/classification (good) was incorrect 308, the assessment/classification can change the publisher to neutral 310. For example, if the further review 306 indicates that the publisher has neither a likelihood of being good above a good publisher threshold nor a likelihood of being bad above a bad publisher threshold, then the publisher can be classified as being neutral. In some embodiments, neutral publishers can be further reviewed, such as by human operators.

Furthermore, in some embodiments, after the publisher's classification has been verified, the publisher can be added to the database to be used as training and/or testing data for the classifier 312. Accordingly, the classifier can stay up to date with the help of recent publisher data.

Figure 3B:
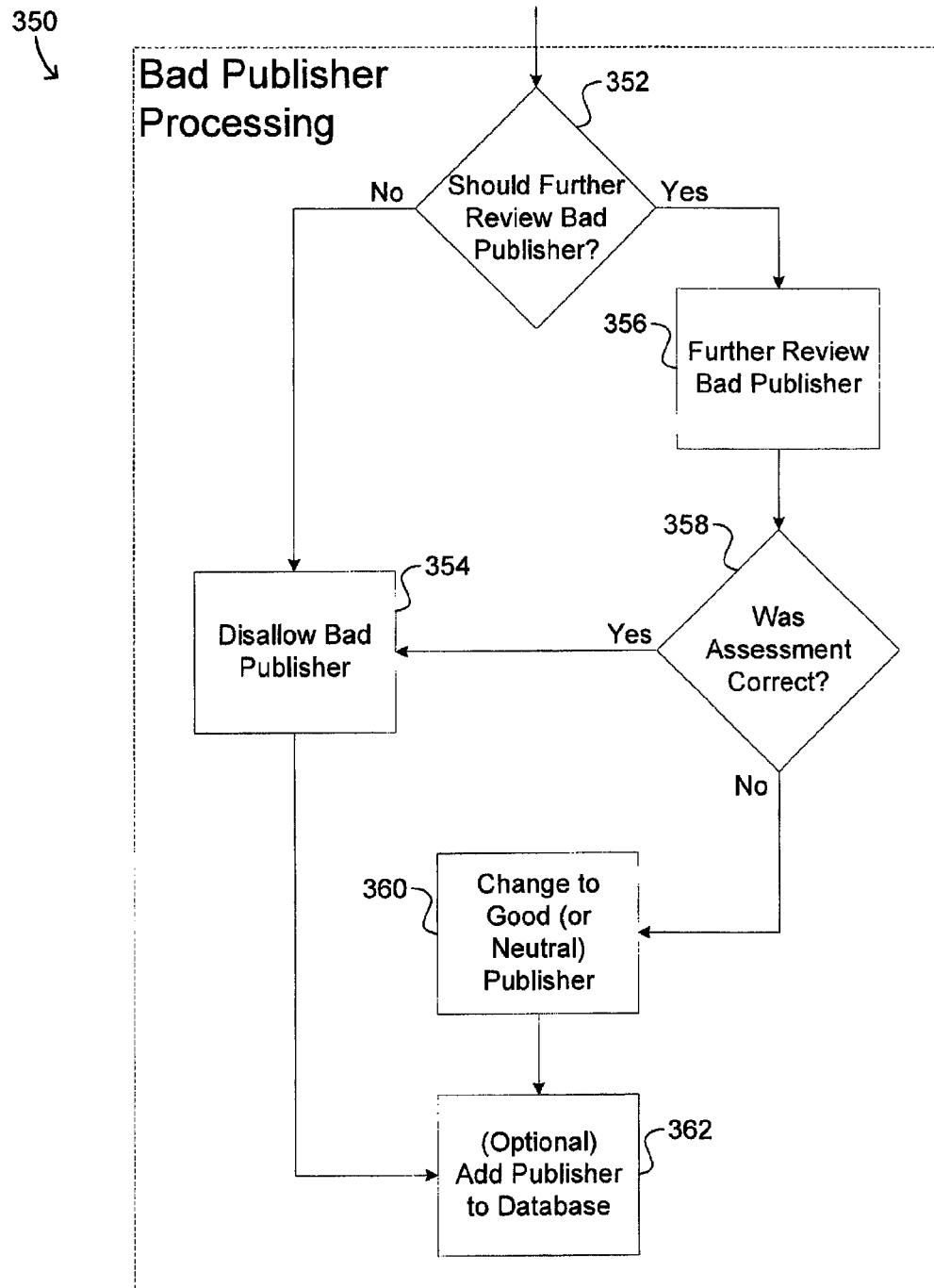
FIG. 3B illustrates an example flowchart for processing a classified publisher utilizing machine-assisted publisher classification.

FIG. 3B illustrates an example flowchart for processing a classified publisher utilizing machine-assisted publisher classification. In some embodiments, when a publisher has been classified as likely being bad, the bad publisher can be further processed, as illustrated in the example flowchart 350 of FIG. 3B. In some embodiments, the bad publisher can be examined to determine whether or not to review the publisher further 352. For example, if the confidence score for the bad publisher at least meets a specified bad publisher score threshold by a sufficient amount, then there need not be further review, the publisher remains bad, and content submitted by the bad publisher will not be allowed to be published 364. Otherwise, the bad publisher can be reviewed further 356. In some embodiments, one or more computing systems and/or human operators can perform the further review 356. In some embodiments, the further review 356 can be with respect to only particular portions of information associated with the publisher (and/or the content provided by the publisher).

In some embodiments, the further review 356 can determine whether or not the previous assessment/classification was correct 358. If the assessment/classification (bad) was correct 358, then the bad publisher can be disallowable (e.g., the publisher is placed on a blacklist) and content submitted by the publisher will likely be disallowed 354. However, if the assessment/classification (bad) was incorrect 358, then the assessment/classification for the publisher can be changed 360 to good. Moreover, in some embodiments, if the assessment/classification (bad) was incorrect 358, the assessment/classification can change the publisher to neutral 360. For example, if the further review 356 indicates that the publisher has neither a likelihood of being good above a good publisher threshold nor a likelihood of being bad above a bad publisher threshold, then the publisher can be classified as being neutral. In some embodiments, neutral publishers can be further reviewed, such as by human operators.

Additionally, in some embodiments, after the publisher's classification has been verified, the publisher can be added to the database to be used as training and/or testing data for the classifier 362. As such, the classifier can update/improve over time to keep up with recent trends.

Figure 4:
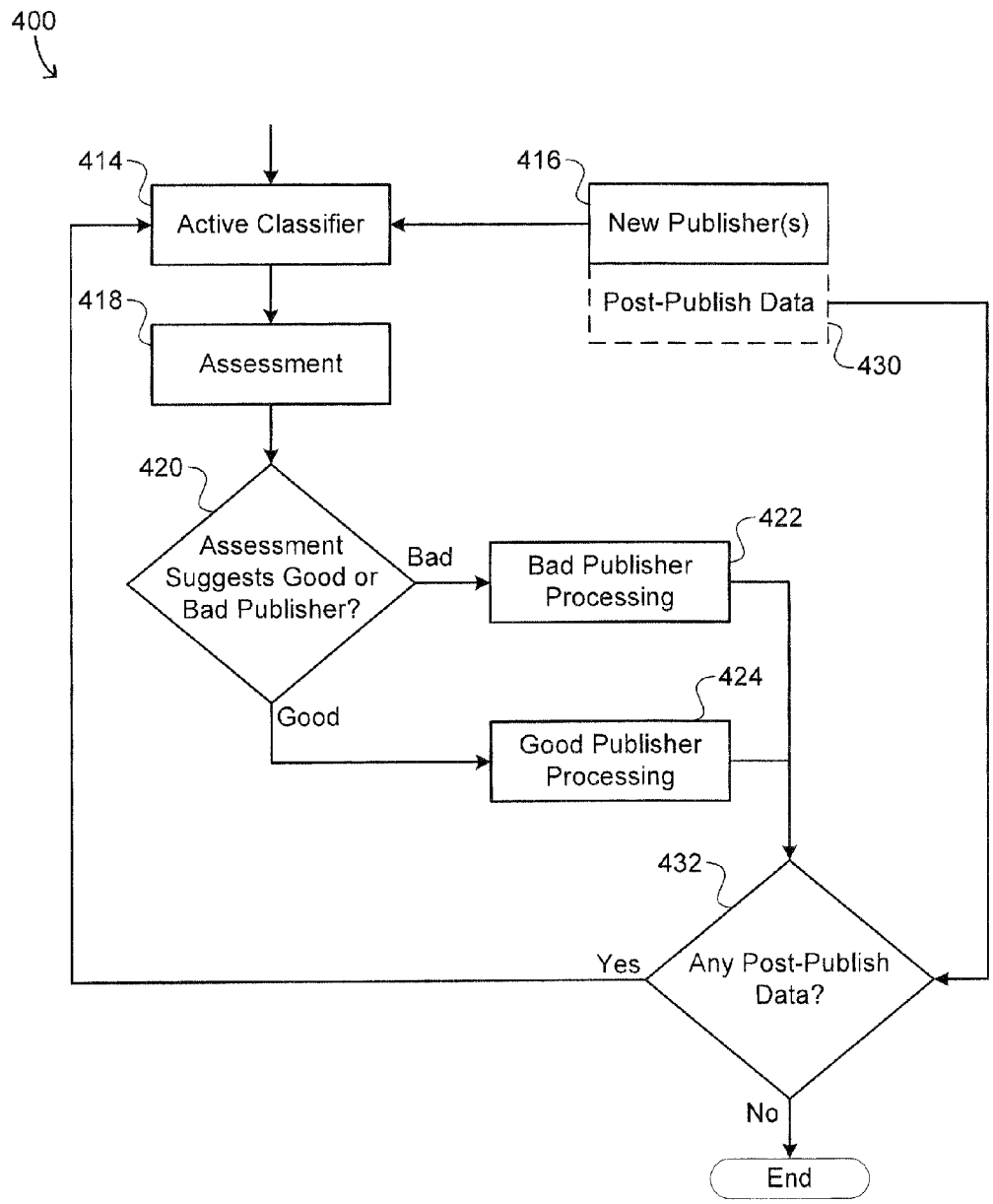
FIG. 4 illustrates an example flowchart for processing a classified publisher utilizing machine-assisted publisher classification.

FIG. 4 illustrates an example flowchart for processing a classified publisher utilizing machine-assisted publisher classification. In some embodiments, there can be information, such as a special value, associated with the publisher 416 indicating that the publisher 416 has not yet received post-publish data 430. On the other hand, in some embodiments, subsequent to a publisher 416 being classified, there can be additional post-publish data 430 for the publisher 416. As shown in FIG. 4, the post-publish data 430 can be detected 432. In response to being detected 432, the post-publish data 430 can be provided to the active classifier 414 such that the active classifier 414 can modify the classification/assessment 418 for the publisher 416 if necessary. Moreover, in some embodiments, post-publish data 430 (if any) can continuously be detected and the classifier 414 can continuously modify the classification/assessment 418 of the publisher 416 as needed.

In one example, a publisher 416 was classified 418 as being good. However, a customer review 430 detected subsequent to publication 432 alleged that content provided by the publisher 416 contained copyrighted material. As such, the classifier 414 can take into consideration the customer review 430 and make an updated classification/assessment 418 for the publisher 416, possibly classifying the publisher 416 as being bad. However, if an editor review 430 is detected subsequently that provides proof that no copyright violations occurred, then the classifier 414 can again adjust the classification/assessment 418 for the publisher 418, possibly labeling the publisher 416 as being good again. Although not shown in FIG. 4, in some embodiments, the post-publish data 430 can also cause the classification/assessment 418 for the publisher 418 to be adjusted such that the publisher 416 is labeled as being neutral.

Figure 5A:
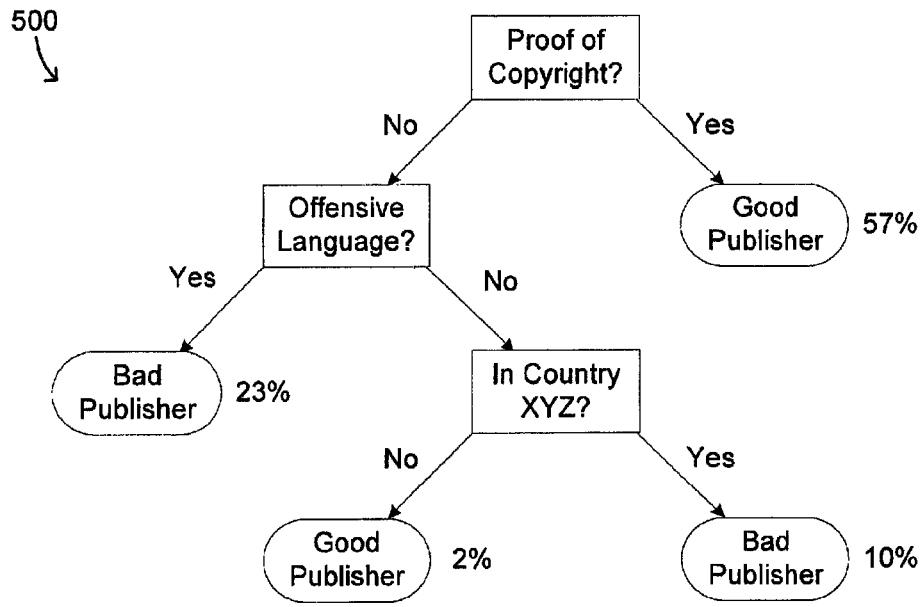
FIG. 5A illustrates an example classifier model that can be utilized for machine-assisted publisher classification.

FIG. 5A illustrates an example classifier model that can be utilized for machine-assisted publisher classification. As shown in FIG. 5A, in some embodiments, the classifier (e.g., 114 in FIG. 1, 414 in FIG. 4, etc.) can construct and utilize a decision tree to classify publishers. For example, the training of the classifier can include constructing the decision tree and the testing of the classifier can include testing the decision tree for accuracy.

FIG. 5A shows a portion of an example decision tree 500 that can be constructed from publisher training data. The portion of the example tree 500 can be constructed to take into account publisher behavior data such as whether a publisher in question provided proof of copyright. In addition, the example decision tree 500 can consider whether the publisher in question offensive language that should be blocked. Moreover, the tree 500 can detect patterns based on the country in which the publisher in question is located. In one example, when a publisher provides proof of copyright, the decision tree 500 can determine that 57% of the time the publisher is good. If there was no proof of copyright and offensive language was allowed (was not blocked), then 23% of the time the publisher would be bad. Moreover, if the offensive language was not allowed (was blocked), and the publisher is in country XYZ, then 10% of the time, the publisher would be bad and only 2% of the time the publisher was good.

Figure 5B:
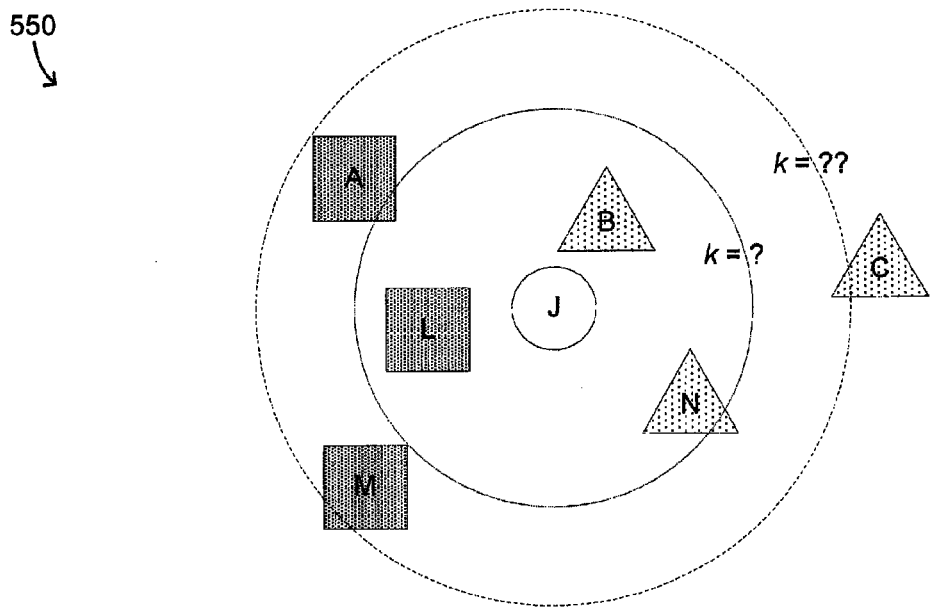
FIG. 5B illustrates an example classifier model that can be utilized for machine-assisted publisher classification.

FIG. 5B illustrates an example classifier model that can be utilized for machine-assisted publisher classification. FIG. 5B shows a k-nearest neighbor model (k-NN) 550 that can be utilized for machine-assisted publisher classification. In the example of FIG. 5B, the classifier is utilizing the k-nearest-neighbor model 550 to classify Publisher J. Publisher J is the center circle. Publishers A, L, and M (squares) can be good publishers. Publishers B, C, and N (triangles) can be bad publishers. In some embodiments, how close J is to each of the other publishers can depend on how similar J is to each of them. In some embodiments, the classifier can select the k value (corresponding to the radii of the dotted circles). Continuing with the example, if the classifier determines that particular traits/characteristics/behaviors are important, then k could equal "?" such that J would be classified as a bad publisher because there are two triangles (> one square) within the inner dotted circle with "k=?". However, if the classifier determines that other traits/characteristics/behaviors are important, then k could equal "??" such that J would be classified as a good publisher because there are three squares (> two triangles) within the outer dotted circle with "k=??".

It is contemplated that a person of ordinary skill in the art would know various other models, algorithms, and/or embodiments that can be implemented consistent with the scope of the present disclosure.

Figure 6A:
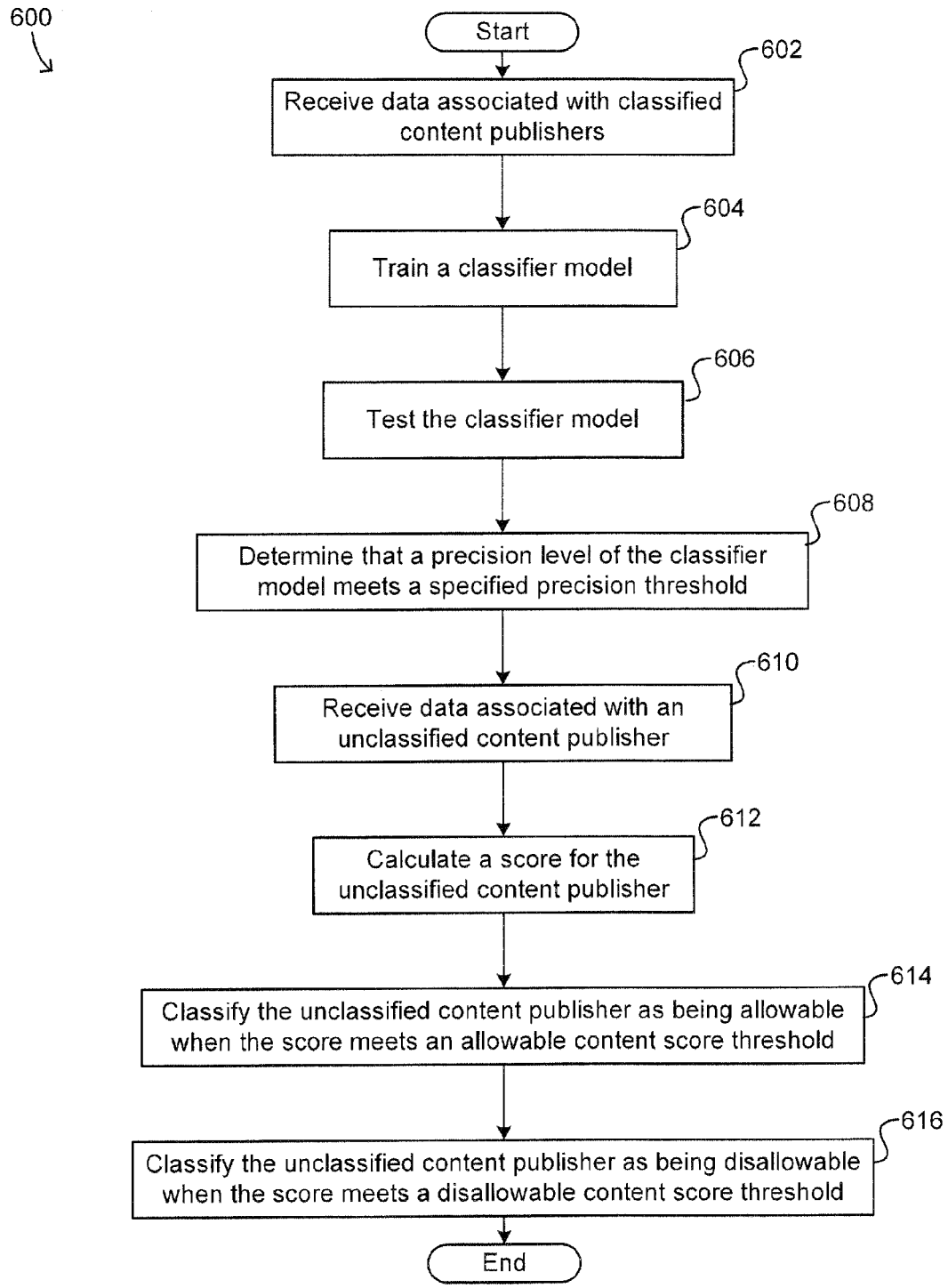
FIG. 6A illustrates an example method embodiment for machine-assisted publisher classification.

FIG. 6A illustrates an example method embodiment for machine-assisted publisher classification. It should be understood that there can be additional, fewer, or alternative steps performed in similar or alternative orders, or in parallel, within the scope of the various embodiments unless otherwise stated. The example method embodiment 600 can start with receiving data associated with a plurality of classified content publishers, at step 602. The data can include training data and testing data. At step 604, the example method 600 can train a classifier model using at least a portion of the training data. Step 606 can include testing the classifier model using at least a portion of the testing data. Then at step 608, the method 600 can determine that a precision level associated with the classifier model has at least met a specified precision threshold.

At step 610, the example method 600 can receive data associated with an unclassified content publisher. Step 612 can include calculating a score for the unclassified content publisher based at least in part on processing the data associated with the unclassified content publisher using the classifier model. The method 600 can classify the unclassified content publisher as being an allowable content publisher when the score has at least met a specified allowable content score threshold, at step 614. Step 616 can include classifying the unclassified content publisher as being a disallowable content publisher when the score has at least met a specified disallowable content score threshold.

Figure 6B:
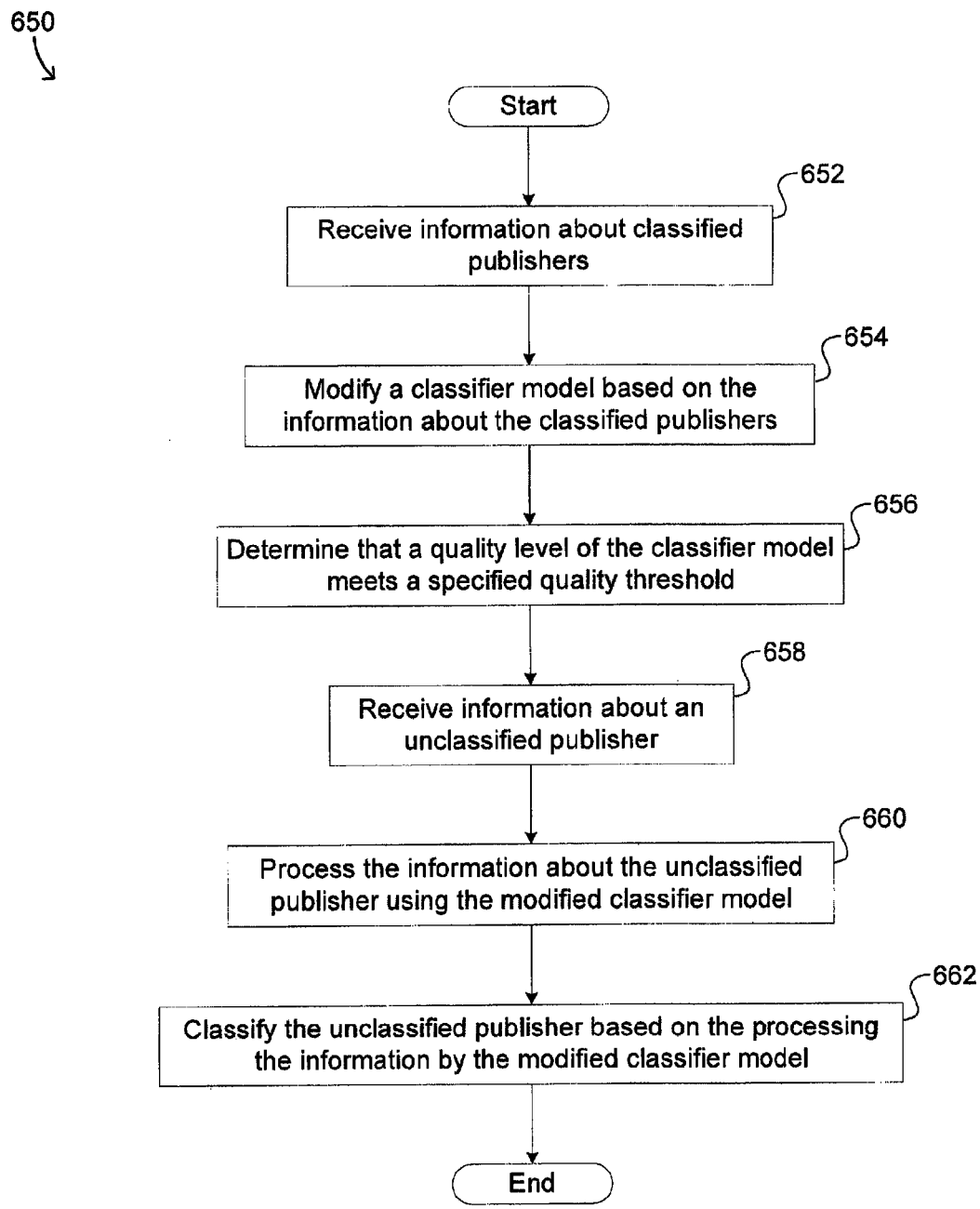
FIG. 6B illustrates an example method embodiment for machine-assisted publisher classification.

FIG. 6B illustrates an example method embodiment for machine-assisted publisher classification. Again, it should be understood that there can be additional, fewer, or alternative steps performed in similar or alternative orders, or in parallel, within the scope of the various embodiments unless otherwise stated. At step 652, the example method embodiment 650 can receive information about one or more classified publishers. The example method 650 can modify a classifier model based at least in part on the information about the one or more classified publishers, at step 654. The method 650 can determine that a quality level associated with the classifier model at least meets a specified quality threshold, at step 656. Step 658 can include receiving information about at least one publisher. The at least one publisher can be unclassified. At step 660, the method 650 can process at least a portion of the information about the at least one publisher using the modified classifier model. Step 662 can include classifying each of the at least one publisher based at least in part on the processing at least the portion of the information by the modified classifier model.

In some embodiments, content provided by each of the at least one publisher classified as being good can be allowed for publication in a content library. Also, content provided by each of the at least one publisher classified as being bad can be denied for publication in the content library. In some embodiments, the content library can be associated with an electronic content distribution source. In some embodiments, the content library can be associated with an electronic marketplace.

Various embodiments consistent with the present disclosure can also be implemented in conjunction with manual review (e.g., by human operators). For example, the machine-assisted publisher classification implementing the classifier can perform an initial broad sweep of a plurality of unclassified publishers in order to classify the publishers. The publishers that are classified with high confidence by the classifier need not be reviewed manually, whereas the classifications made with lower confidence can be reviewed manually (e.g., by human operators). The initial machine-assisted broad sweep utilizing the classifier can nonetheless significantly reduce the workload of manual review.

Figure 7:
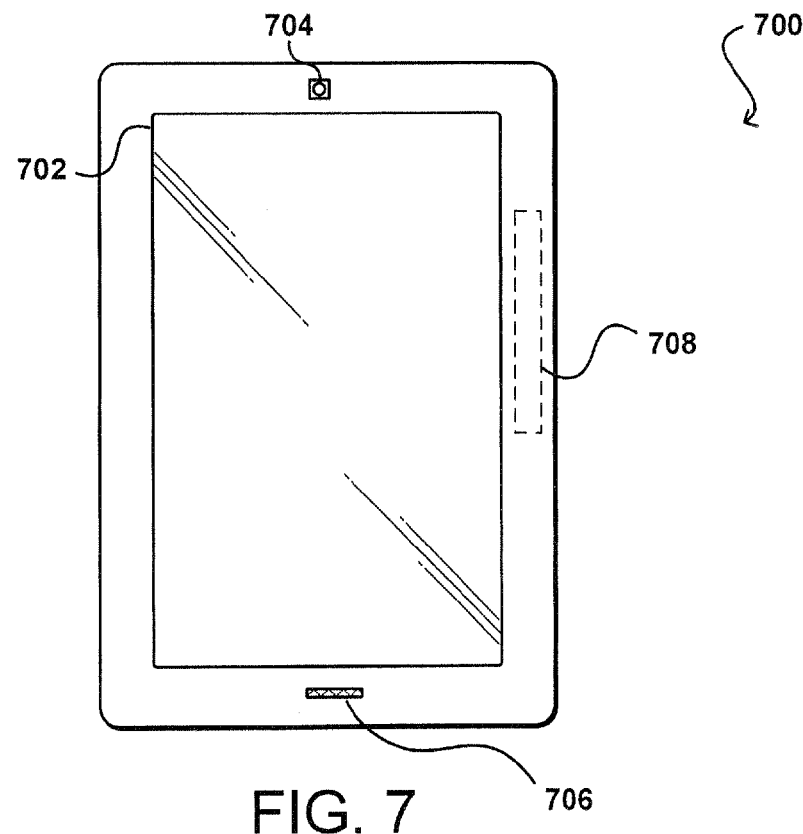
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
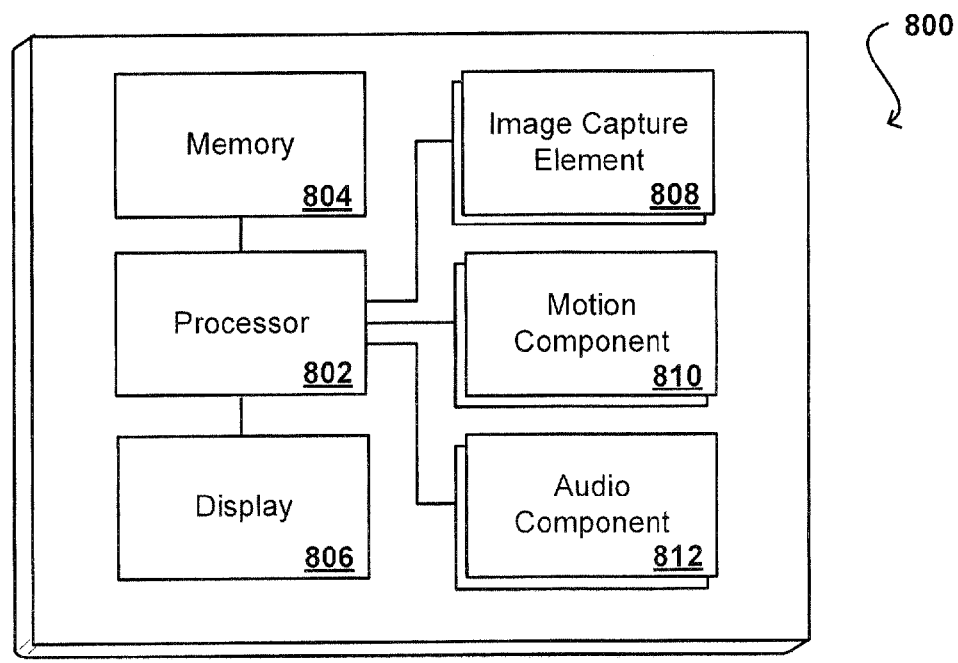
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
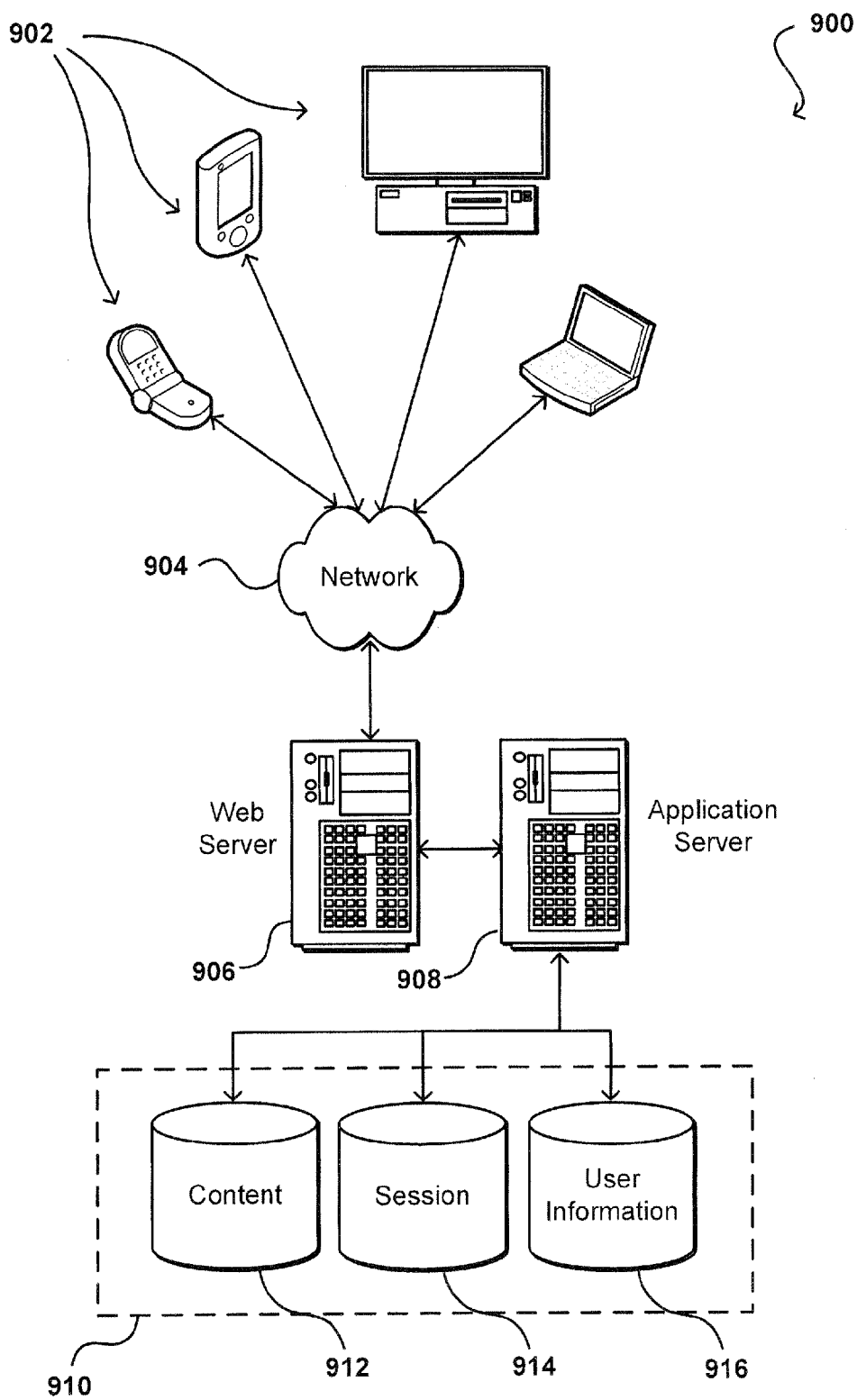
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this ease, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Pell, Python, or TCL, as well as combinations thereof. The server(s) may also include database servers, including without imitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for classifying content publishers, comprising:
   receiving data associated with a plurality of classified content publishers, the data including training data and testing data;
   training a classifier model using at least a portion of the training data;
   defining a first category of the classifier model, the first category identifying allowable content publishers;
   defining a second category of the classifier model, the second category identifying disallowable content publishers;
   defining a third category of the classifier model, the third category identifying content publishers needing further review;
   testing the classifier model using at least a portion of the testing data;
   determining that a precision level associated with the classifier model has at least met a specified precision threshold;
   receiving data associated with an unclassified content publisher;
   calculating a score for the unclassified content publisher based at least in part on processing the data associated with the unclassified content publisher using the classifier model; and
   classifying the unclassified content publisher as belonging to one of the first category, the second category, or the third category, the classifying being based upon the score for the unclassified content publisher.

2. The computer-implemented method of claim 1, further comprising:
   publishing content provided by the allowable content publisher in a content library.

3. The computer-implemented method of claim 1, further comprising:
   denying publication of content provided by the disallowable content publisher in the content library.

4. The computer-implemented method of claim 1, wherein each of the training data and the testing data comprises a publisher behavior data, associated with the plurality of classified content publishers, and wherein the data associated with the unclassified content publisher comprises publisher behavior data associated with the unclassified content publisher.

5. A computer-implemented method comprising:
   receiving information about one or more classified publishers;
   modifying a classifier model based at least in part on the information about the one or more classified publishers;
   defining a first category of the classifier model, the first category identifying allowable content publishers;
   defining a second category of the classifier model, the second category identifying disallowable content publishers;
   defining a third category of the classifier model, the third category identifying content publishers needing further review;
   determining that a quality level associated with the classifier model at least meets a specified quality threshold;
   receiving information about at least one publisher, the at least one publisher being unclassified;
   processing at least a portion of the information about the at least one publisher using the modified classifier model; and
   classifying each of the at least one publisher as belonging to one of the first category, the second category or the third category, based at least in part on the processing at least the portion of the information by the modified classifier model.

6. The computer-implemented method of claim 5, wherein the classifying each of the at least one publisher comprises calculating a confidence score for the classifying of each of the at least one publisher based at least in part on the processing at least the portion of the information by the modified classifier model.

7. The computer-implemented method of claim 6, wherein the classifying each of the at least one publisher comprises classifying a first one of the at least one publisher as being good when the confidence score for the classifying of the first one of the at least one publisher at least meets a specified good publisher threshold and classifying a second one of the at least one publisher as being bad when the confidence score for the classifying of the second one of the at least one publisher at least meets a specified bad publisher threshold.

8. The computer-implemented method of claim 7, wherein the specified good specified good publisher threshold and the specified bad publisher threshold are within an allowable deviation from being equivalent.

9. The computer-implemented method of claim 7, wherein the classifying each of the at least one publisher further comprises classifying a third one of the at least one publisher as being neutral when the confidence score for the third one of the at least one publisher is below the specified good publisher threshold and below the specified bad publisher threshold.

10. The computer-implemented method of claim 7, wherein each of the at least one publisher classified as being good is associated with a whitelist and wherein each of the at least one publisher classified as being bad is associated with a blacklist.

11. The computer-implemented method of claim 7, wherein content provided by each of the at least one publisher classified as being good is allowed for publication in a content library and wherein content provided by each of the at least one publisher classified as being bad is denied for publication in the content library.

12. The computer-implemented method of claim 5, wherein the information about the one or more classified publishers comprises at least one of pre-publish data, publisher behavior data, or post-publish data associated with the one or more classified publishers, and wherein the information about the at least one publisher comprises at least one of pre-publish data or publisher behavior data associated with the at least one publisher.

13. The computer-implemented method of claim 5, further comprising:
receiving post-publish data associated with the at least one publisher subsequent to the classifying; and
classifying the at least one publisher based at least in part on the post-publish data.

14. The computer-implemented method of claim 13, wherein the post-publish data is associated with a user feedback of content provided by the at least one publisher.

15. The computer-implemented method of claim 5, wherein the classifier model is associated with at least one of a decision tree or a K-nearest-neighbor model.

16. The computer-implemented method of claim 5, wherein the quality level associated with the classifier model includes a precision level indicative of how accurate the classifier model is.

17. The computer-implemented method of claim 16, wherein the determining that the quality level associated with the classifier model meets the specified quality threshold further comprises:
testing the classifier model using at least in part the information about the one or more classified publishers, wherein the testing results in the precision level; and
determining that the precision level resulting from the testing at least meets a specified precision level.

18. The computer-implemented method of claim 5, wherein the information received about the one or more publishers includes classification information resulting from manual review of the one or more publishers.

19. A system comprising:
a processor; and
a memory device including instructions that, when executed by the processor, cause the system to:
receive information about one or more classified publishers;
modify a classifier model based at least in part on the information about the one or more classified publishers;
define a first category of the classifier model, the first category identifying allowable content providers;
define a second category of the classifier model, the second category identifying disallowable content providers;
define a third category of the classifier model, the third category identifying content publishers needing further review;
determine that a quality level associated with the classifier model at least meets a specified quality threshold;
receive information about at least one publisher, the at least one publisher being unclassified;
process at least a portion of the information about the at least one publisher using the modified classifier model; and
classify each of the at least one publisher as belonging to one of the first category, the second category or the third category, based at least in part on the processing at least the portion of the information by the modified classifier model.

20. The system of claim 19, wherein the classifying each of the at least one publisher comprises calculating a confidence score for the classifying of each of the at least one publisher based at least in part on the processing at least the portion of the information by the modified classifier model.

21. The system of claim 20, wherein the classifying each of the at least one publisher comprises classifying a first one of the at least one publisher as being good when the confidence score for the classifying of the first one of the at least one publisher at least meets a specified good publisher threshold and classifying a second one of the at least one publisher as being bad when the confidence score for the classifying of the second one of the at least one publisher at least meets a specified bad publisher threshold.

22. The system of claim 21, wherein each of the at least one publisher classified as being good is associated with a whitelist and wherein each of the at least one publisher classified as being bad is associated with a blacklist.

23. The system of claim 21, wherein content provided by each of the at least one publisher classified as being good is allowed for publication in a content library and wherein content provided by each of the at least one publisher classified as being bad is denied for publication in the content library.

24. A non-transitory computer-readable storage medium including instructions for identifying elements, the instructions when executed by a processor of a computing system causing the computing system to:
receive information about one or more classified publishers;
modify a classifier model based at least in part on the information about the one or more classified publishers;
define a first category of the classifier model for allowable content publishers;
define a second category of the classifier model for disallowable content providers;
define a third category of the classifier model, the third category identifying content publishers needing further review;
determine that a quality level associated with the classifier model at least meets a specified quality threshold;
receive information about at least one publisher, the at least one publisher being unclassified;

process at least a portion of the information about the at least one publisher using the modified classifier model; and classify each of the at least one publisher as belonging to one of the first category, the second category, or the third category, based at least in part on the processing at least the portion of the information by the modified classifier model.

25. The non-transitory computer-readable storage medium of claim 24, wherein the classifier model is associated with at least one of a decision tree or a K-nearest-neighbor Mode.

* * * * *